UNITED STATES PATENT OFFICE.

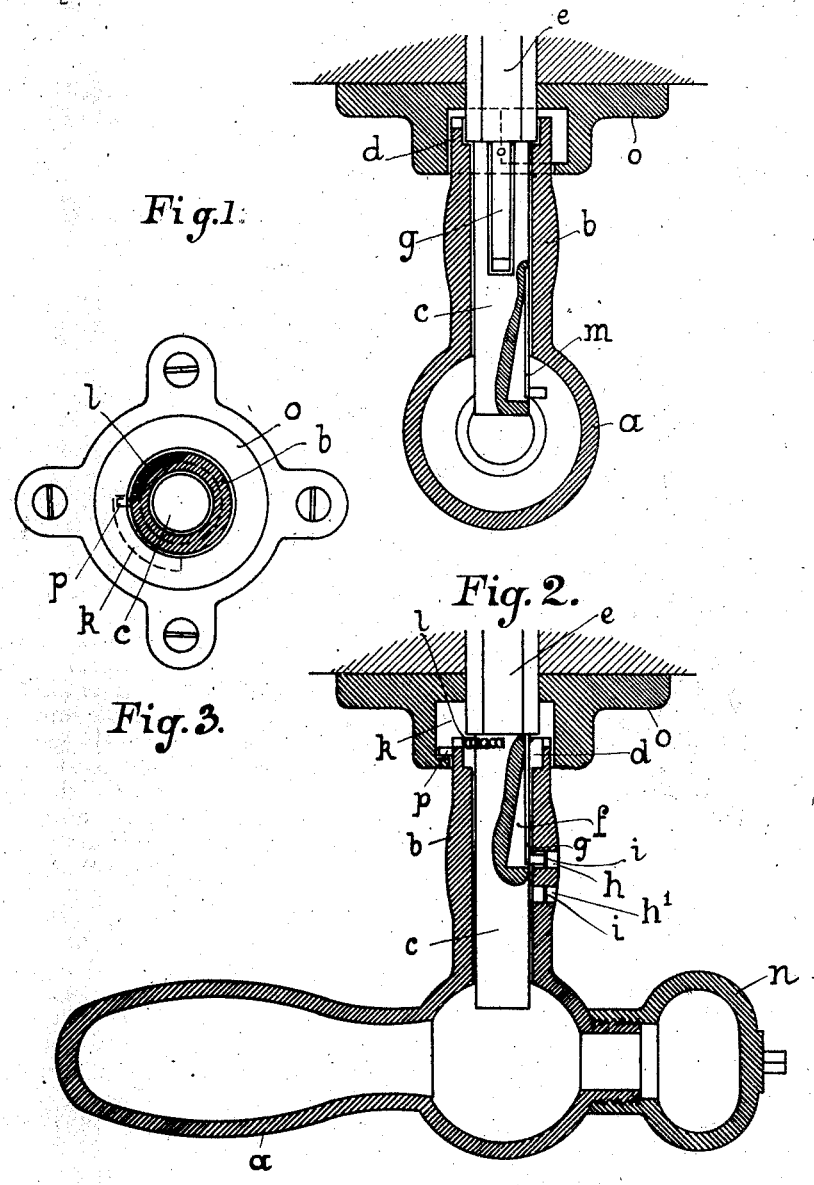

EDUARD ZWILLER, OF STOCKHOLM, SWEDEN.

DOOR-LATCH.

No. 923,233.  Specification of Letters Patent.  Patented June 1, 1909.

Application filed October 26, 1908. Serial No. 459,653.

*To all whom it may concern:*

Be it known that I, EDUARD ZWILLER, confectioner, residing at the Grand Hotel, Stockholm, Sweden, have invented certain new and useful Improvements in and Relating to Door-Latches, of which the following is a specification.

The present invention relates to a door-latch, the object of which is to prevent anyone who is not familiar with the mechanism, from opening the door.

In the annexed drawing the invention is illustrated, Figure 1 representing a section of the door-latch in operative, and Fig. 2 a section of the same in inoperative position, while Fig. 3 shows a front elevation of the rose-plate.

A hollow handle $a$ is rotatably and slidably mounted with its shank $b$ on the spindle $c$. The inner portion $e$ of said spindle is provided with an angular enlargement on which the nozzle $d$ of the shank $b$ is made to fit, so that the latter engages with the spindle when the handle is pushed inward.

The spindle $c$ is provided with a spring $g$ having a lug which engages with circumferential slots $h$ and $h^1$ in the shank $b$. In said slots weak blade springs $i$ are provided to serve as abutment for the lug of the spring $g$. The normal position of the handle is controlled by a spring $l$ mounted in a recess of the rose-plate $o$, which spring for that purpose engages with the said rose-plate and the shank $b$. To limit the rotary movement of the handle, the shank $b$ is provided with a projection $p$ moving in and controlled by a recess $k$ in the rose-plate. A spring pawl $m$ on the spindle $c$ prevents the handle from being pulled off. When taking the device to pieces, said spring pawl $m$ must be depressed and for that purpose the knob $n$ on the handle $a$ can be unscrewed.

The operation of the device is as follows:—

A suitable attachment to the door-key, is inserted in the slot $h$ of the shank $b$. By pressing down the spring $i$, the lug of the spring $g$ will be forced into the recess $f$ on the spindle $c$. This releases the handle which can then be pushed home where the nozzle $d$ of the shank $b$ engages with the angular portion $e$ of the spindle $c$. The handle is now in operative position and is kept there by the lug of the spring $g$ which engages with the slot $h^1$ of the shank $b$. In order to return the handle to its inoperative position, said lug must again be depressed by inserting the door-key attachment in the slot $h^1$ and the handle can then be pulled out.

In the inoperative position the handle will, if turned, merely rotate idly on the cylindrical part of the spindle $c$ and return, when released, through the influence of the spring $l$.

I claim:—

1. A door-latch, comprising a spindle having an outer cylindrical and an inner, enlarged, angular portion, a handle slidably and rotatably mounted with its shank on the cylindrical part of said spindle and provided with an angular nozzle adapted to fit on and engage with the angular portion of said spindle, circumferential slots in said shank, a spring mounted in a recess in said spindle and having a lug adapted to engage with said circumferential slots of the shank, so as to hold the handle in and out of operative engagement with said spindle respectively, substantially as set forth.

2. A door-latch, comprising a spindle, a handle mounted with its shank on said spindle and adapted to be brought in and out of operative engagement with said spindle, a spring mounted in a recess in said spindle, a lug on said spring adapted to engage with circumferential slots in said shank so as to hold the handle in and out of operative engagement with said spindle, and blade springs mounted in said slots and adapted to be depressed from outside so as to bring said lug out of engagement with said slots, substantially as set forth.

3. A door-latch, comprising a spindle, a handle mounted with its shank on said spindle and adapted to be brought in and out of operative engagement with said spindle, means for holding said handle in operative and inoperative engagement with said spindle, a spring-actuated pawl mounted in a recess in said handle and adapted to engage with the shank of said handle so as to prevent it from being drawn off said spindle, and a knob on said handle adapted to be unscrewed for the purpose of depressing said spring and removing the handle, substantially as set forth.

4. A door-latch, comprising a spindle, a handle mounted with its shank on said spindle and adapted to be brought in and out of operative engagement with said spindle, means for holding said handle in operative and inoperative engagement with said spindle, a rose-plate adapted to receive the ends of said shank, a projection on said end of the shank, a recess in said rose-plate adapted to receive said projection and limit the movement of said projection and of the handle, and a spiral spring mounted in said rose-plate and having one end attached to said rose-plate and the other to said shank so as to hold said shank and the handle in inoperated position, substantially as set forth.

In testimony whereof I have hereunto set my hand in the presence of two witnesses.

EDUARD ZWILLER.

Witnesses:
 EDITH OLSSON,
 HJALMAR ZETTERSTROM.